(12) United States Patent
Girlea et al.

(10) Patent No.: US 8,263,027 B2
(45) Date of Patent: Sep. 11, 2012

(54) APPARATUS, SYSTEMS AND METHODS FOR THE PRODUCTION OF HYDROGEN

(75) Inventors: Florin Girlea, Flushing, NY (US); John C. Leylegian, White Plains, NY (US)

(73) Assignee: Alliant Techsystems Inc., Arlington, VA (US)

( * ) Notice: Subject to any disclaimer, the term of this patent is extended or adjusted under 35 U.S.C. 154(b) by 538 days.

(21) Appl. No.: 12/540,331

(22) Filed: Aug. 12, 2009

(65) Prior Publication Data
US 2011/0038762 A1    Feb. 17, 2011

(51) Int. Cl.
  *B01J 8/00* (2006.01)
  *B21D 51/16* (2006.01)

(52) U.S. Cl. ........ 422/602; 422/187; 422/600; 422/625; 422/627; 422/628; 422/629; 422/630; 422/631; 422/634; 126/259 M; D23/330; 165/81; 48/127.9; 48/61; 29/890; 29/890.039

(58) Field of Classification Search .................. 422/187, 422/600, 602, 625, 627, 628, 629, 630, 631, 422/634; 126/259 M; 165/81; D23/330
See application file for complete search history.

(56) References Cited

U.S. PATENT DOCUMENTS

| | | | |
|---|---|---|---|
| 3,225,824 A * | 12/1965 | Wartenburg | 165/122 |
| 4,291,681 A * | 9/1981 | Berringer | 126/673 |
| 4,364,726 A * | 12/1982 | Forster et al. | 431/215 |
| 5,464,606 A | 11/1995 | Buswell et al. | |
| 5,851,636 A * | 12/1998 | Lang et al. | 428/167 |
| 6,071,593 A * | 6/2000 | Lang et al. | 428/167 |
| 6,180,846 B1 * | 1/2001 | Dandekar et al. | 585/443 |
| 6,555,267 B1 * | 4/2003 | Broman et al. | 429/210 |
| 6,667,123 B2 | 12/2003 | Yu | |
| 6,767,376 B1 | 7/2004 | Perna et al. | |
| 6,824,592 B2 * | 11/2004 | Monzyk et al. | 96/4 |
| 7,195,742 B2 | 3/2007 | Liu et al. | |
| 7,261,750 B1 | 8/2007 | Autenrieth et al. | |
| 7,271,127 B2 | 9/2007 | Nam et al. | |
| 7,357,821 B2 | 4/2008 | Wolf et al. | |
| 7,867,297 B2 * | 1/2011 | Yamamoto et al. | 48/61 |
| 2009/0130496 A1 * | 5/2009 | Ono et al. | 429/12 |

FOREIGN PATENT DOCUMENTS

WO    2004046276 A2    6/2004

OTHER PUBLICATIONS

Chen, Tim, "Investigation of Catalytic Autothermal Reforming Process for Hydrogen Production," Proceedings of the TTT2005 Academic Conference, pp. 69-83.

* cited by examiner

*Primary Examiner* — Kaity V. Handal
(74) *Attorney, Agent, or Firm* — TraskBritt

(57) ABSTRACT

Apparatus and methods for the production of hydrogen using a reformer including a housing, a first plate having a first plurality of fin structures and a second plate having a second plurality of fin structures assembled such that the first plurality of fin structures is interleaved with the second plurality of fin structures. At least one inlet port is formed in at least one of the first plate and the second plate, and at least one outlet port is formed in at least one of the first plate and the second plate. The fin structures may be coated with a catalytic material to enhance or stimulate reactions taking place within the apparatus. A heat exchange device may also be integrated into one or both plates of the reformer.

37 Claims, 8 Drawing Sheets

APPARATUS, SYSTEMS AND METHODS FOR THE PRODUCTION OF HYDROGEN

TECHNOLOGICAL FIELD

The present invention relates generally to the production of hydrogen and, more specifically, to the production of hydrogen through the use of hydrocarbon autothermal reformers which may include an integral heat exchanger and systems incorporating such reformers.

BACKGROUND

Fuel cells are widely recognized as being promising alternative energy devices. Generally, fuel cells generate clean electric power quietly and without directly combusting fuels. Fuel cells operate by converting chemical energy (such as from $O_2$ and $H_2$) into electricity in a relatively efficient manner. For example, proton exchange membrane (PEM) fuel cells are considered to be approximately 40% efficient, phosphoric acid fuel cells (PAFCs) are considered to be approximately 45% efficient and molten carbonate fuel cells (MCFCs) and solid oxide fuel cells (SOFCs) are considered to be between approximately 40% to 80% efficient depending on their specific configurations. The greater the efficiency of a fuel cell, the greater conservation of energy, as well as the lower the emissions of $CO_2$.

Considerable efforts have been expended to develop and manufacture fuel cells as alternative power sources for a variety of products. For example, fuel cells have been developed for use in automotive applications. Additionally, efforts have been made to develop fuel cells to replace batteries for a variety of electronic devices, including cell phones and laptop computers.

Many fuel cells, such as PEM fuel cells, operate using a process that requires hydrogen. Hydrogen may be produced in a variety of ways including, for example, electrolysis, high temperature electrolysis, thermochemical, or through reforming processes. Considerable efforts have been made to improve the production of hydrogen. In many cases, it becomes desirable to produce hydrogen on site or "on-demand" rather than having to require bulk storage of hydrogen.

Reforming is a process used to produce hydrogen gas from hydrocarbons using an appropriate catalyst. For example, one type of reforming is known as steam-methane reforming (SMR). In the SMR process, methane reacts with steam on a nickel catalyst to produce hydrogen and carbon monoxide (also known as synthesis gas or "syngas") according to the following chemical equation:

$$CH_4 + H_2O \rightarrow CO + 3H_2$$

The SMR process is conventionally carried out at temperatures of approximately 850° C. and at pressure levels of approximately 1 to 2 megaPascals (MPa). The SMR process is endothermic and conventionally uses an external source of hot gas to heat tubes in which the catalytic reaction takes place.

Another reforming process is known as autothermal reforming (ATR). In one form, the ATR process uses oxygen and carbon dioxide in a reaction with methane to form hydrogen and carbon monoxide according to the following chemical equation:

$$2CH_4 + O_2 + CO_2 \rightarrow 3H_2 + 3CO + H_2O + Heat$$

In another form, the ATR process uses oxygen and steam in a reaction with methane according to the following chemical equation:

$$2CH_4 + O_2 + H_2O \rightarrow 5H_2 + 3CO + 2CO$$

Yet another reforming process is known as partial oxidation that produces syngas according to the following chemical reaction:

$$CH_4 + H_2O \rightarrow 2H_2 + CO$$

It is desirable within the industry to continually improve hydrogen production processes including the various reforming processes. It is also desirable within the industry to improve the apparatuses, systems and methods associated with the production of hydrogen such as may be used with fuel cells and other devices.

BRIEF SUMMARY

Embodiments described herein include apparatuses for producing hydrogen, reformers, reformer systems and related methods. For example, in accordance with one embodiment described herein, an apparatus for producing hydrogen comprises a first plate having a first plurality of fin structures and a second plate having a second plurality of fin structures. The first plate and the second plate are assembled such that the plurality of fin structures on the first plate is interleaved with the plurality of fin structures on the second plate. At least one inlet port is formed in at least one of the first plate and the second plate, and at least one outlet port is formed in at least one of the first plate and the second plate.

In certain embodiments described herein, the apparatus may further include an integrated heat exchange device associated with either the first plate, or the second plate, or both the first plate and the second plate. Additionally, the second plate may include a third plurality of fin structures. The apparatus may include a third plate having a further plurality of fin structures on one side thereof or both sides thereof. The third plate and the second plate may be assembled such that the third plurality of fin structures and the fourth plurality of fin structures are interleaved with one another. The first plate, the second plate, and the third plate may be assembled such that the first plurality of fin structures of the first plate are interleaved with the third plurality of fin structures of the third plate and the second plurality of fin structures of the second plate are interleaved with the fourth plurality of fin structures of the third plate. One or more fin structures of the first plate, the second plate, and the third plate may be configured to include a flow path through at least a portion thereof. Another flow path may be configured between adjacent fin structures. Additionally, the fin structures may be coated with a catalytic material to enhance or stimulate a desired reaction taking place within the apparatus.

In accordance with another embodiment described herein, a method of forming a reformer apparatus is described. The method includes providing a first plate having a first plurality of fin structures and providing a second plate having a second plurality of fin structures. The first plate and the second plate are assembled such that the first plurality of fin structures and the second plurality of fin structures are interleaved with respect to each other. A first flow path is provided through at least a portion of at least one fin structure of the first and second pluralities. A second flow path is provided between adjacent fin structures of the first and second pluralities of fin structures. A coating of catalytic material may be deposited on the fin structures of the first and second plates, if desired. Adjacent fin structures may be arranged and spaced approximately 0.04 inch apart from one another. A heat exchange device with at least one channel is formed in either the first plate and/or the second plate in one embodiment described herein. In accordance with another embodiment described herein, a system comprises at least one water-gas shift reactor, at least one preferential oxidation reactor, and at least one auto thermal reformer, a first plate having a first plurality of fin structures, and a second plate having a second plurality of fin structures. The first plate and the second plate are assembled such that the first plurality of fin structures is interleaved with the second plurality of fin structures. At least one inlet port is formed in at least one of the first plate and the second plate, and at least one outlet port is formed in at least one of the first plate and the second plate.

In certain embodiments described herein, the apparatus may further include an integrated heat exchange device associated with the first plate, the second plate, or both. Additionally, the second plate may include a third plurality of fin structures and the apparatus may include a third plate having a further plurality of fin structures. The third plate and the second plate may be assembled such that the third and fourth pluralities of fin structures are interleaved with one another.

One or more fin structures may be configured to include a flow path through at least a portion thereof. Another flow path may be configured between adjacent fin structures. Additionally, the fin structures may be coated with a catalytic material to enhance or stimulate a desired reaction taking place within the apparatus.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION

Figure 1A:
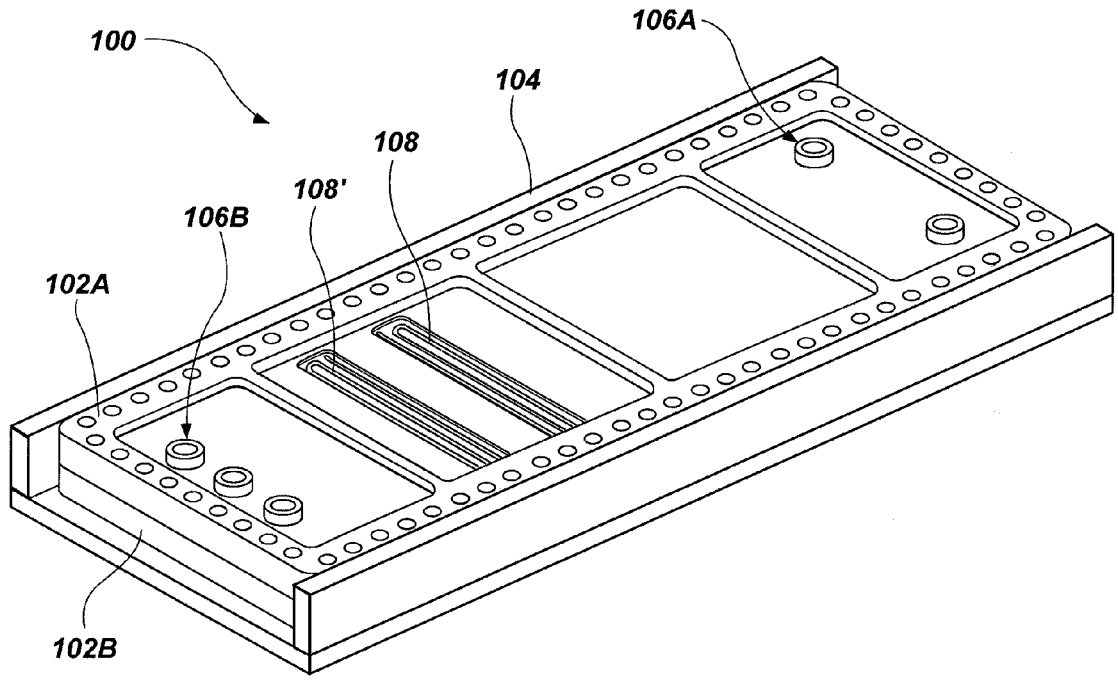
FIG. 1A is a perspective view of a reformer according to an embodiment of the present invention.
Figure 1B:
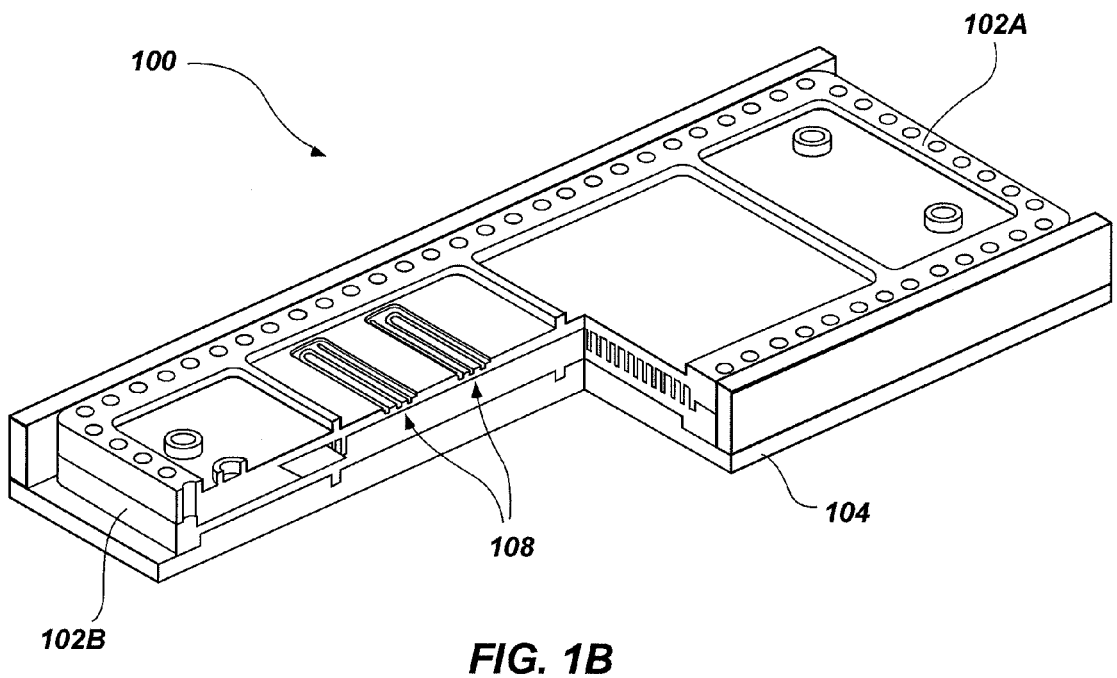
FIG. 1B is a perspective view of the reformer of FIG. 1A with a section cut away to show a partial cross-section of the reformer.

Referring to FIGS. 1A and 1B, an auto thermal reformer 100 is shown in accordance with an embodiment described herein. The auto thermal reformer 100 includes a first (or top) plate 102A stacked on, or otherwise coupled with, a second (or bottom) plate 102B. In one embodiment, a plurality of suitable type fasteners may be used to couple the first plate 102A to the second plate 102B, each plate having a well known suitable type seal therewith. When assembled, the plates 102A, 102B create a fluid tight chamber therewithin or therebetween. The reformer 100 may be disposed in or mounted to a housing 104 or other type suitable structure depending on the intended environment for the operation of the reformer 100. In one embodiment, the housing 104 may include an insulating material. For example, in one particular embodiment, the housing 104 may include an alumina silicate material, hydrated calcium carbonate material, magnesium carbonate material, etc., as the insulating material.

Each plate 102A and 102B may include one or more ports 106A for introducing fluid components into the reformer 100 (or more specifically, into the fluid chamber formed by the plate 102A assembled to the plate 102B) and one or more ports 106B for discharging fluid components from the reformer 100. One, or both, of the plates 102A and 102B may be configured to incorporate or otherwise be coupled with a heat exchanger. For example, a recess 108 may be formed in a plate (e.g., plate 102A) to complementarily receive one or more heat exchange devices as will be discussed in further detail hereinbelow.

Figure 2A:
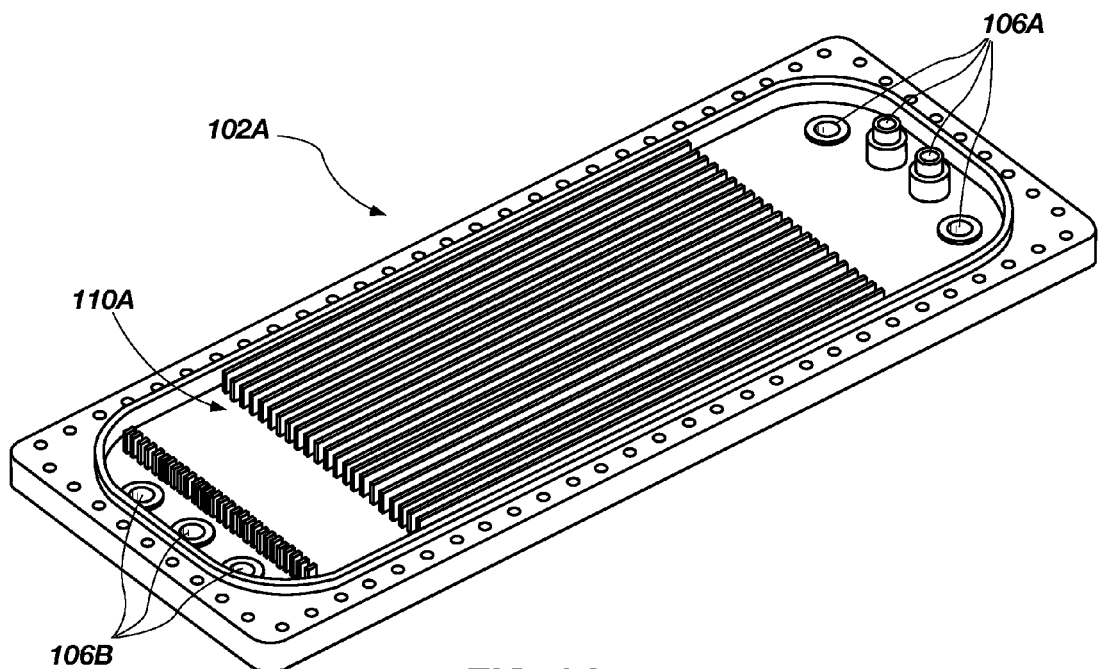
FIG. 2A is a perspective view of a first portion of the reformer of FIG. 1A.
Figure 2B:
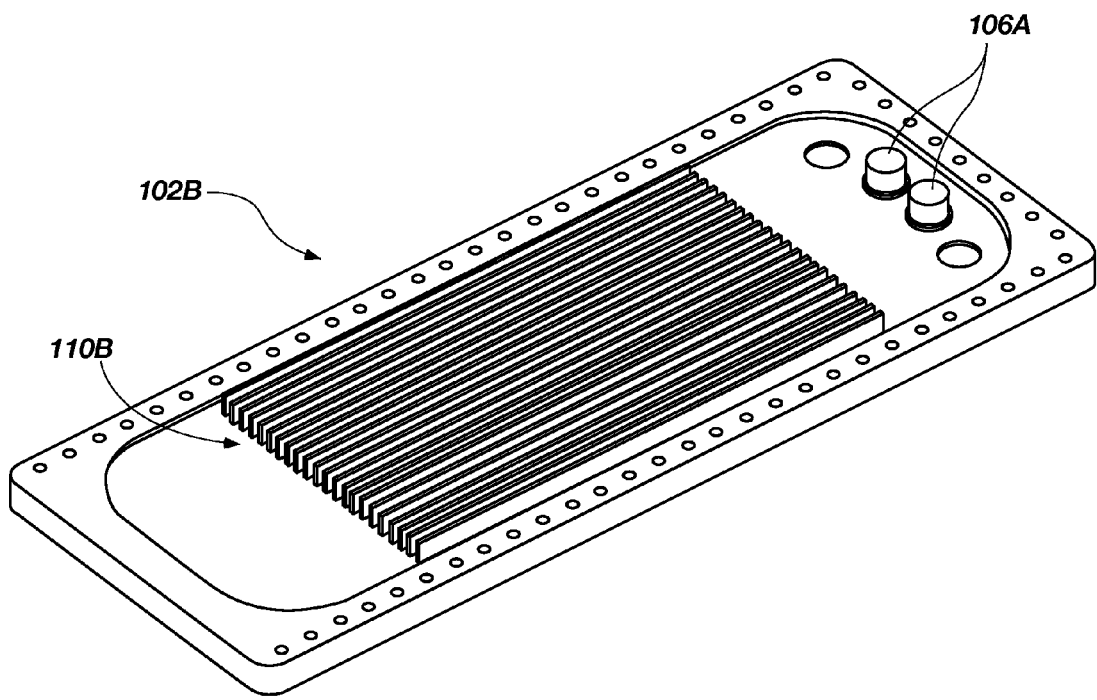
FIG. 2B is a perspective view of a second portion of the reformer of FIG. 1A.
Figure 3:
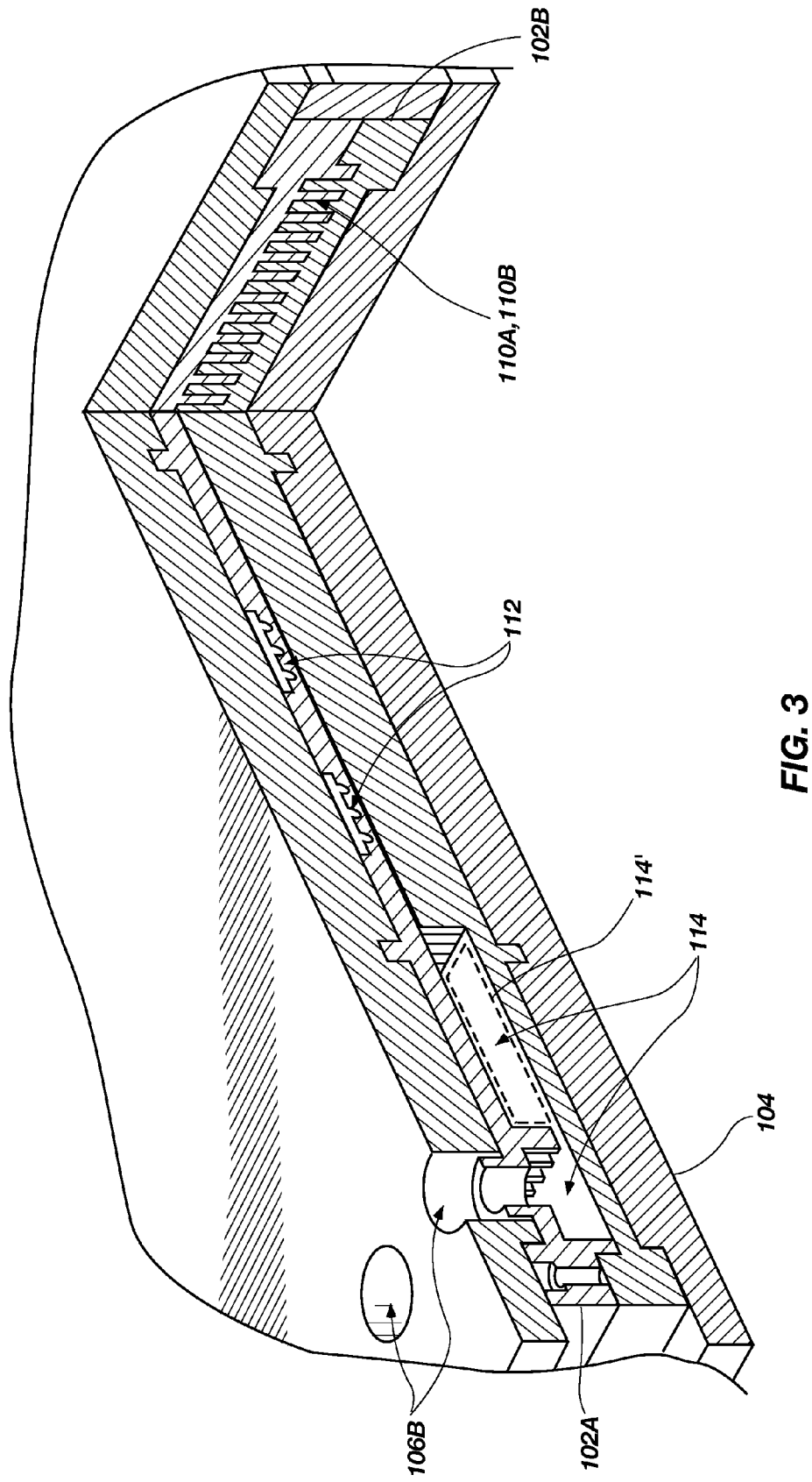
FIG. 3 is an enlarged view of a cross-sectioned region of a reformer.

Referring to FIG. 1B in conjunction with FIGS. 2A and 2B, the plates 102A and 102B may include a plurality of fin structures (referred to as fins herein for purposes of convenience and designated as fin structure 110A for a fin structure associated with the first plate 102A and fin structure 110B for a fin structure associated with the second plate 102B). The fin structure 110A or fin structure 110B for a plate 102A or plate 102B runs in a generally parallel direction to one another and may run along the length of the plate 102A and plate 102B. The plate 102A and plate 102B are configured such that their respective fin structure 110A and fin structure 110B are interleaved with one another when the plate 102A and plate 102B are assembled such as illustrated in FIGS. 1A and 3. In other words, except for a laterally outermost fin of a fin structure 110A and fin structure 110B, the fins of fin structure 110A of the first plate 102A are generally disposed between fins of fin structure 110B of the second plate 102B. Such a configuration results in an alternating lateral arrangement of a fin of fin structure 110A from the first plate 102A and a fin of fin structure 110B from the second plate 102B. The fins 110A and 110B of the two plates 102A and 102B do not laterally touch or engage each other. Thus, a fluid flow path is formed or exists between adjacent fins of fin structure 110A and fin structure 110B. Additionally, the fins of fin structure 110A and fin structure 110B may be coated with a suitable catalytic material to assist in a desired reaction of products flowing through the reformer 100. Examples of suitable catalytic materials include platinum, palladium, and alloys thereof.

As illustrated in FIG. 3, and discussed herein, a heat exchanger 112 may be associated with the first plate 102A (or the second plate 102B or both plate 102A and plate 102B). The heat exchanger 112 may include any suitable material configured to conduct heat away from the plate 102A and to another device, system or environment. In one embodiment, the heat exchanger 112 may include a fluid flowing through channels such as channels 108' of the recess 108 (FIG. 1A), such that the fluid carries the heat away from the plates 102A and 102B. As such, the fluid may carry transferred heat to another device, system or environment, or it may utilize the heat (or a portion of the heat) to further an associated process or otherwise prepare a fluid for subsequent process operations. In one instance, heat from the heat exchanger 112 may be utilized to vaporize a hydrocarbon fuel, water and air prior to their entry into the reformer 100.

As also shown in FIG. 3, one or more plenums 114 may be formed upon assembly of the plate 102A and the plate 102B. Such plenums 114 may act as exhaust plenums with product fluid flowing between the fins 110A and 110B into such plenums 114 and then out exhaust ports 106B. The plenums 114 may also be associated with a desulfurization process as the plenums allow for the insertion of a suitable replaceable desulfurization cartridge 114' (a removable and replaceable sulfur filter).

Figure 4:
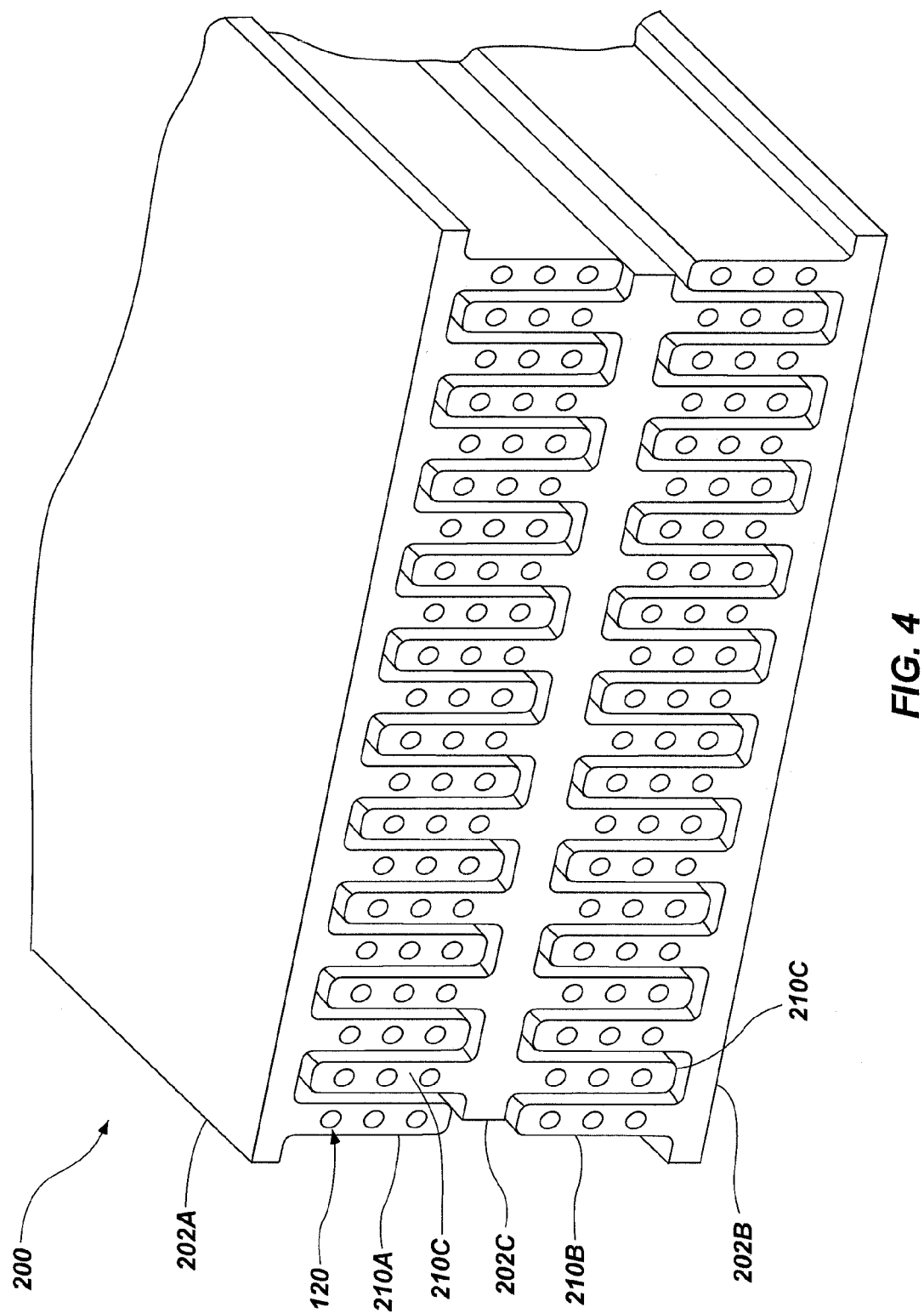
FIG. 4 is a cross-sectional view of a portion of the reformer shown in FIG. 1A including showing various inlet ports according to an embodiment of the present invention.

Referring briefly to FIG. 4, a perspective end view of another embodiment of a reformer 200 is shown. The reformer 200 includes a first (top) plate 202A, a second (bottom) plate 202B and a third (central) plate 202C. Each plate 202A, 202B and 202C includes a plurality of fins 210A, 210B and 210C, respectively. The first plate 202A and the second plate 202B are generally similar to those plates described hereinabove with respect to FIGS. 1A, 1B, 2A, 2B and 3. The third plate 202C includes fins 210C extending from two opposing sides thereof. When assembled, the fins 210A of the first plate 202A are interleaved with fins 210C on one side of the third plate 202C in a manner such as described herein, while the fins 210B of the second plate 202B are interleaved with the fins 210C of the second side of the third plate 202C in a manner similar to that which has been described herein. The use of a third central plate 202C such as illustrated in FIG. 4 provides additional surface area for reactions to take place within the reformer 200. The additional plates, such as plate 202C having fins on multiple sides, may be used in any reformer to further exemplify flow capacity thereof.

Figure 5A:
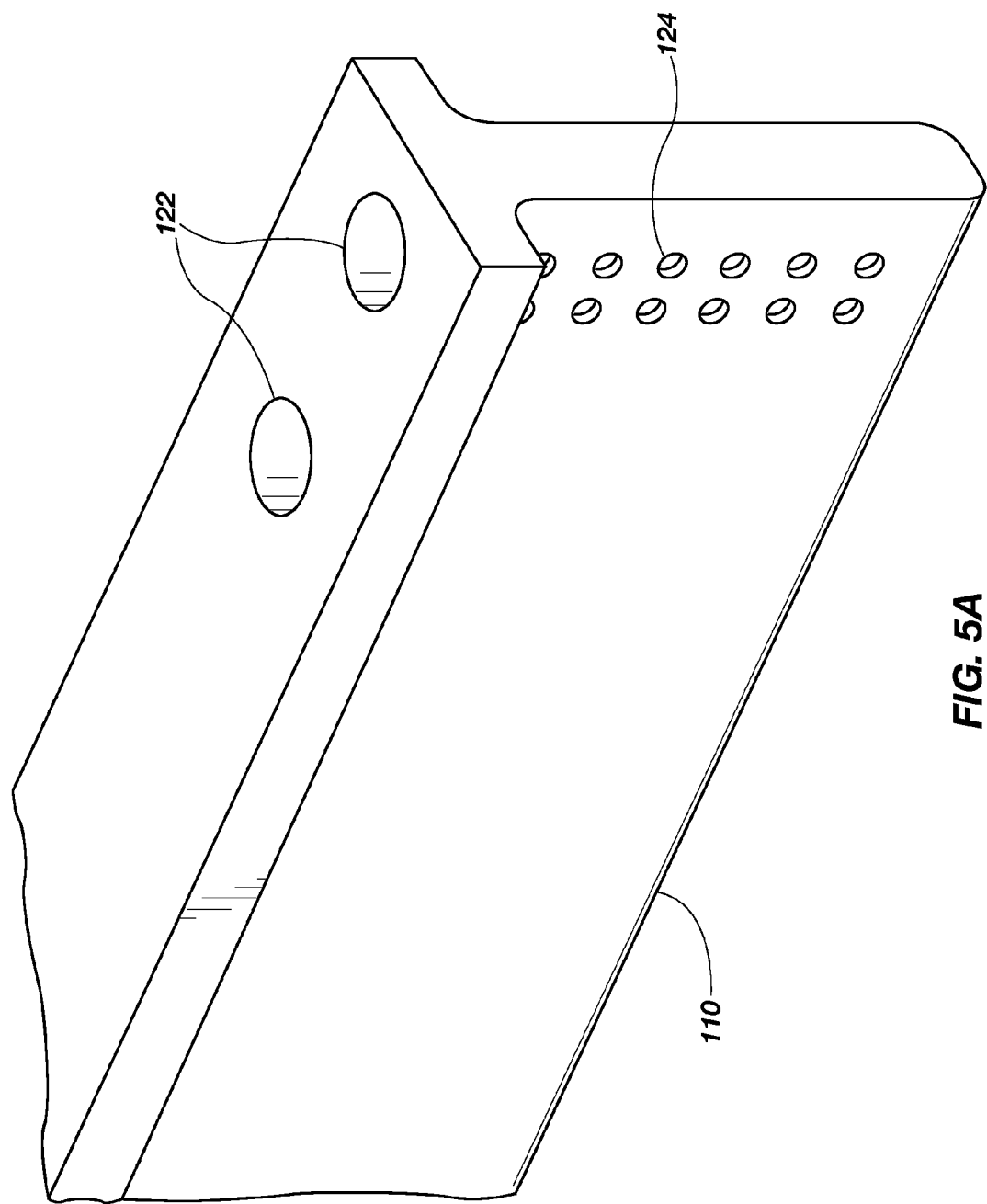
FIG. 5A is a perspective view of a fin of a reformer.
Figure 5B:
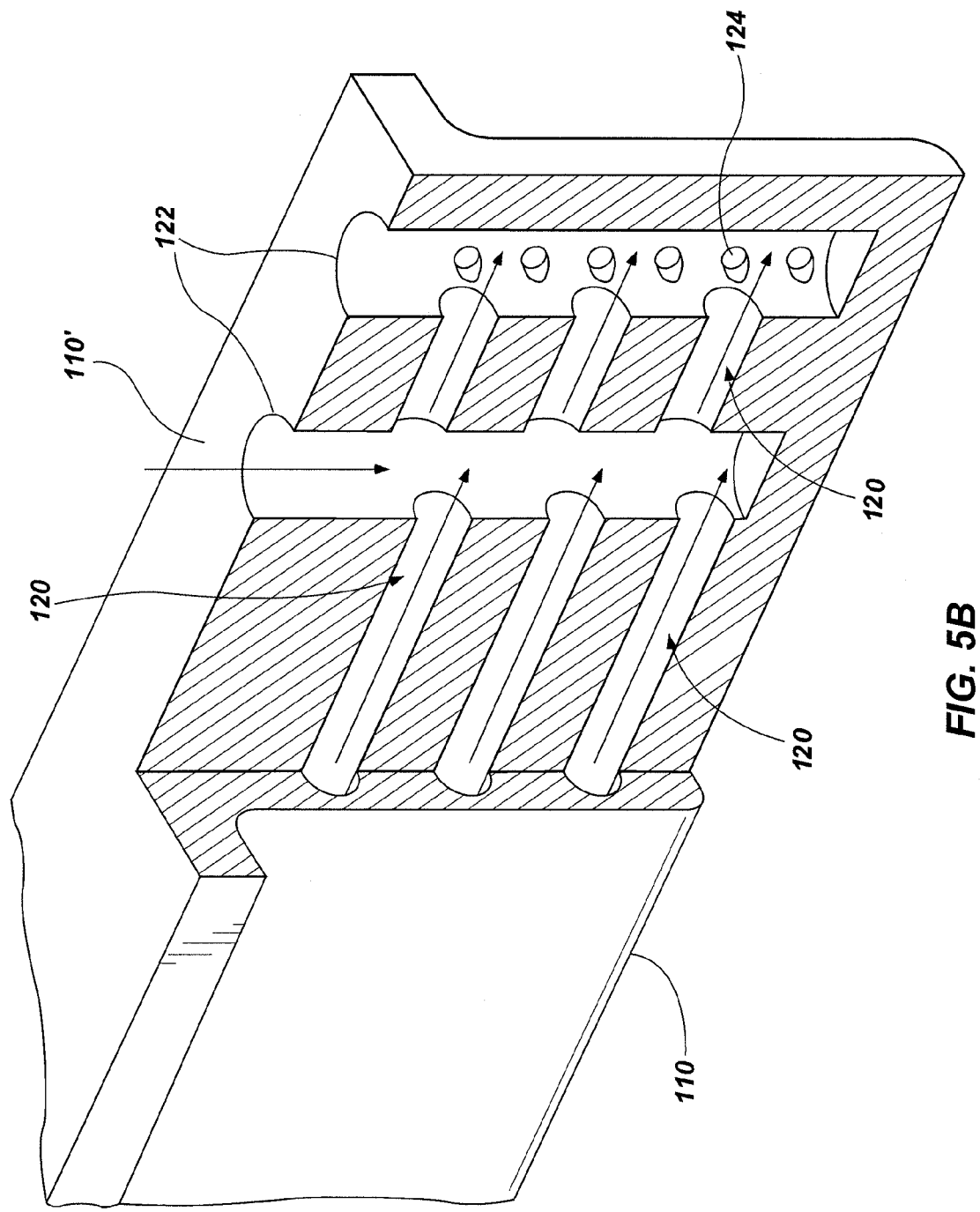
FIG. 5B is a partial cross-sectional view of the fin shown in FIG. 5A.

Referring now to FIGS. 5A and 5B, further details are shown of a fin (referred to generally as fin 110 for convenience). The fin 110 includes a plurality of longitudinally extending channels 120 (FIG. 5B, see also FIG. 4) within the fin 110 that extend from one end of the fin 110 toward the opposing end of the fin 110 for any desired distance. One or more cross channels 122 extend from a surface 110' of the fin 110 intersecting the channels 120, or of the plate (e.g., plate 102A or plate 102B (FIGS. 2A and 2B)) that includes the fin 110, with the cross channels 122 intersecting the channels 120 at any desired angle relative to the longitudinally extending channels 120. The longitudinally extending channels 120 and the cross channels 122 are in fluid communication with one another such that fluid flowing through the longitudinally extending channels 120 and fluid flowing through the cross channels 122 mix with one another and then exit the fin 110 through a plurality of apertures 124 or exit ports.

For example, in one embodiment, a fuel product may flow through the longitudinally extending channels 120 and intermix with air flowing through the cross channels 122. The two fluids may react to form a desired product which flows out of the apertures 124 and along the external surfaces of the fins 110 initially in a direction substantially counter or perpendicular to the direction of fluid flow in the longitudinally extending channels 120.

A reformer configured according to the example embodiments described herein provides numerous advantages. For example, the components of a reformer as described herein are readily manufactured with each plate being individually constructed and the reformer subsequently assembled from such plates. Additionally, catalyst materials are readily deposited onto the fins of the plates. Not only is such an advantage during initial manufacturing, but also during reconditioning of the reformer wherein new layers of catalytic material may be applied to the fins. The example embodiments also provide the advantage of minimizing thermal mass of the reformer that enables a faster start-up of the reformer during operation. Further, temperature gradients are minimized across the height of the reformer which helps to maintain the integrity of the fins as well as the flow paths therebetween.

Figure 6:
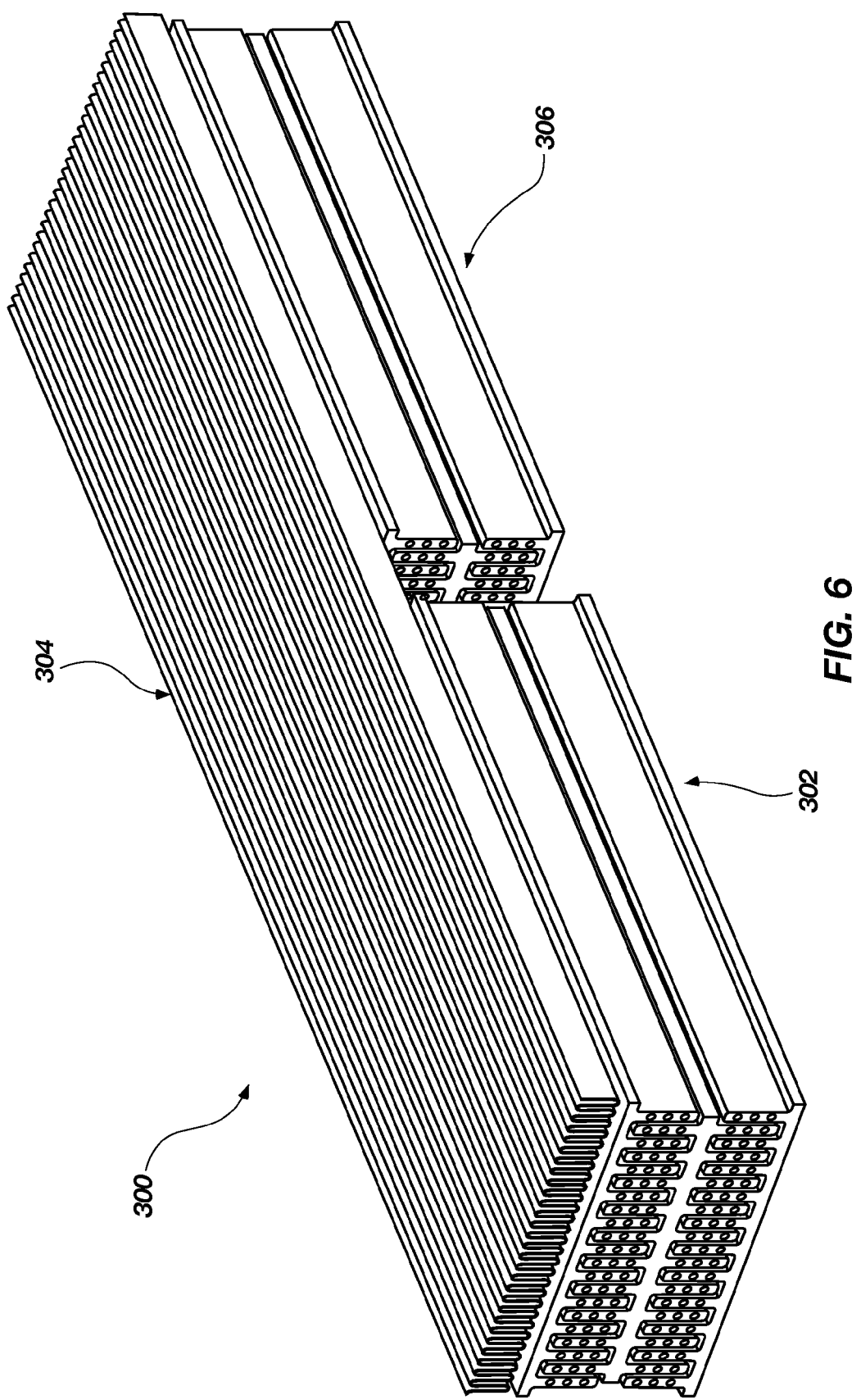
FIG. 6 is a perspective view of a system incorporating a reformer in accordance with an embodiment of the present invention.
Figure 7:
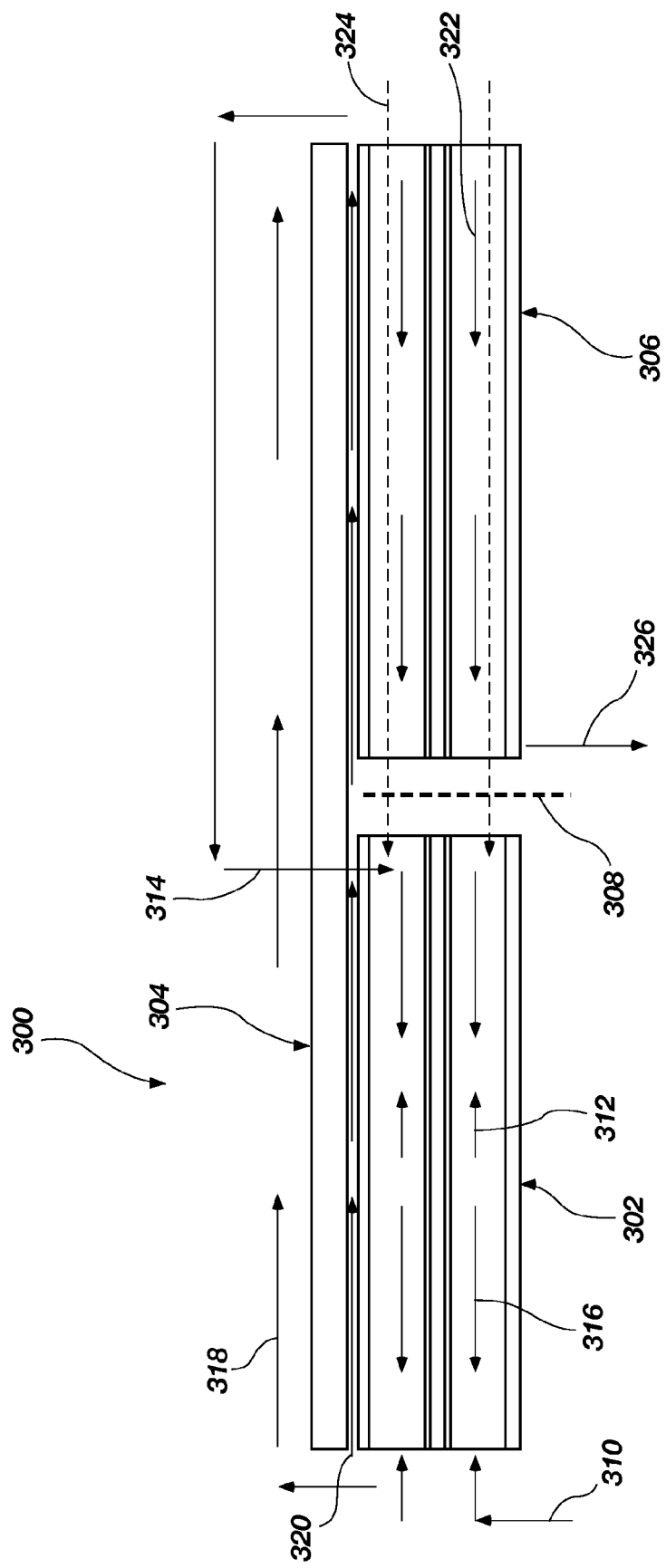
FIG. 7 is a schematic of the system shown in FIG. 6.

Referring now to FIGS. 6 and 7, a system 300 is illustrated which includes an autothermal reformer (ATR) 302, a water gas shift (WGS) reactor 304, and a preferential oxidation (PROX) reactor 306. The ATR 302 may be constructed in a manner such as described herein with respect to the various embodiments of a reformer. A bulkhead 308 (not shown in FIG. 6, shown in FIG. 7) is typically positioned between the ATR 302 and the PROX reactor 306 to segregate, or selectively segregate, some or all of the fluid flows that occur in each device.

In one example, a liquid flow of fuel and water is vaporized and enters the ATR 302 as indicated by flow line 310. The fuel-water mixture flows through the fins of the ATR, such as through the longitudinally extending channels 120 of the fin 110 (FIG. 5B) as is indicated by flow line 312. Air enters the ATR 302, as indicated by flow line 314, and is mixed with the fuel-water mixture to react and form a desired product. For example, a fuel such as JP-8 (a jet fuel standard specified by the United States government in 1990, also know as NATO code F-34, MIL-DTL-83133 and British Defence Standard 91-87), may be mixed with water and vaporized. The reaction product, which may include $H_2$, flows between fins (see, e.g., fins 210A, 210B and 210C in FIG. 4) as indicated by flow line 316.

The ATR may utilize a catalytic partial oxidation reaction, which is an exothermic reaction, combined with an endothermic catalytic steam reforming reaction to produce an $H_2$ and CO rich stream. The partial oxidation reaction may include a chemical reaction according to the following equation:

$$CH_4 + \tfrac{1}{2}O_2 \rightarrow 2H_2 + CO$$

The steam reforming reaction may include a chemical reaction according to the following equation:

$$CH_4 + H_2O \rightarrow 3H_2 + CO$$

The reaction products may then flow through the WGS reactor 304 and be subjected to further processing as indicated by flow line 318. Cooling air may also flow through the WGS reactor 304 as indicated by flow line 320.

Generally, the WGS process may include a water splitting process, which may be used to obtain additional $H_2$. The WGS 304 reactor may employ a chemical process according to the following equation:

$$CO + H_2O \rightarrow CO_2 + H_2$$

The product stream may then enter the PROX reactor 306 for further processing of the product as indicated by flow line 322. The PROX reactor 306 may use a process to convert CO to $CO_2$ and to produce additional $H_2$. Cooling air may also flow through the PROX reactor as indicated by flow line 324. $H_2$ product then exits the PROX reactor 306 as indicated by flow line 326.

EXAMPLE

One particular example of an auto thermal reformer (ATR) is now set forth with general reference to drawing figures. The ATR according to the present example is configured to provide an appropriate volume of $H_2$ to a 2 kW PEM fuel cell.

The ATR (e.g., ATR 302) is sized to provide 37 standard liters per minute (SLPM) of $H_2$ for a fuel cell that will have an efficiency of approximately 50%. A fuel of JP-8 with water and air will be used to produce $H_2$. A combined flow through of JP-8, air and $H_2O$ will be 100.15 SLPM. The molar fractions of JP-8, $H_2O$ and $O_2$ will be, respectively, 0.013269639, 0.291932059 and 0.694798301. The steam-to-carbon ratio will be 2.0 and the oxygen-to-carbon ratio will be 1.0. The Volumetric Hourly Space Velocity will be 30,000 per hour.

The plates (e.g., plate 102A and plate 102B) of the ATR are configured of a ferritic alloy material (e.g., FeCrAl) that will be capable of continual operation at approximately 1400° C. The fins (e.g., 110) of the ATR will exhibit a length of approximately 10 inches, a height of approximately 0.5 inch, and a width of approximately 0.088 inch. A catalytic material comprising platinum, palladium, and alloys thereof may be deposited on the fins of the ATR at a thickness of approximately 0.006 inch. The flow path width (i.e., the spacing between adjacent, opposing catalytic walls of the fins) will be approximately 0.04 inch. The catalyst surface area per flow-path volume will be approximately 700 to 800 square feet per cubic feet ($ft^2/ft^3$).

The various reactants (i.e., JP-8, $H_2O$ and air) will be at a temperature of approximately 350° C. or greater prior to entry into the ATR and the product temperature upon exiting the ATR will be approximately 310° C. or less. The operating pressure of the ATR will be approximately 20 pounds per square inch absolute.

Such an ATR, combined with a WGS reactor and a PROX reactor such as has been described above, will be capable of producing high purity hydrogen from JP-8, water and air with less than 10 parts per million (ppm) of carbon monoxide with the hydrogen being suitable for use in a PEM fuel cell.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An apparatus for producing hydrogen comprising:
   a first plate including a first fin structure comprising a first plurality of fins located thereon;
   a second fin structure comprising a second plurality of fins located thereon, the first plate and the second plate being assembled having a portion of at least one fin of the first plurality of fins of the first plate interleaved with at least a portion of at least one fin of the second plurality of fins of the second plate;
   at least one inlet port formed in at least one of the first plate and the second plate; and
   at least one outlet port formed in at least one of the first plate and the second plate;
   wherein at least one fin of the first plurality of fins of the first plate includes:
      at least one longitudinally extending channel extending from a first portion within the at least one fin of the first plurality of fins toward a second portion within the at least one fin of the first plurality of fins; and
      at least one cross channel extending through the at least one fin of the first plurality of fin structures in fluid communication with the at least one longitudinally extending channel of the at least one fin of the first plurality of fins.

2. The apparatus of claim 1, further comprising:
   a housing for at least portions of the first plate and the second plate.

3. The apparatus of claim 2, further comprising:
   insulation contacting at least a portion of the housing.

4. The apparatus of claim 3, wherein the insulation comprises one of alumina silicate material, hydrated calcium carbonate material, magnesium carbonate material, and combinations thereof.

5. The apparatus of claim 1, further comprising:
   a filter located in a portion of an area between the first plate and the second plate.

6. The apparatus of claim 5, wherein the filter comprises a cartridge type filter.

7. The apparatus of claim 5, wherein the filter comprises a replaceable desulfurization cartridge.

8. The apparatus of claim 1, wherein the at least one fin of the first plurality of fins further includes at least one aperture in fluid communication with the at least one cross channel and an exterior of the at least one fin of the first plurality of fins.

9. The apparatus of claim 8, wherein at least one fin of the second plurality of fins of the second plate includes:
   at least one longitudinally extending channel extending from a first portion within the at least one fin of the second plurality of fins toward a second portion within the at least one fin of the second plurality of fins;
   at least one cross channel extending through the at least one fin of the second plurality of fins in fluid communication with the at least one longitudinally extending channel of the at least one fin of the second plurality of fins; and
   at least one aperture in fluid communication with the at least one cross channel and an exterior of the at least one fin of the second plurality of fins.

10. The apparatus of claim 1, wherein at least one of the first plurality of fins and the second plurality of fins includes a catalytic material.

11. The apparatus of claim 10, wherein the catalytic material comprises platinum, palladium, and alloys thereof.

12. The apparatus of claim 11, wherein the catalytic material exhibits a thickness of approximately 0.006 inch.

13. The apparatus of claim 1, wherein the first plate and the second plate comprise a ferritic alloy material.

14. The apparatus of claim 13, wherein the ferritic alloy material comprises FeCrAl.

15. The apparatus of claim 1, wherein the spacing between a fin of the first plurality of fins of the first plate and an adjacent fin of the second plurality of fins of the second plate comprises approximately 0.04 inch.

16. The apparatus of claim 1, further comprising at least one heat exchange device formed within at least one of the first plate and the second plate.

17. The apparatus of claim 1, wherein the second plate further includes a third fin structure comprising a third plurality of fins.

18. The apparatus of claim 17, further comprising:
   a fin structure comprising a fourth plurality of fins assembled with the second plate, the third plate having the fourth plurality of fins interleaved with the third plurality of fins of the second plate.

19. A method of forming a reformer apparatus, the method comprising:
   forming a first plate having a first fin structure comprising a plurality of fins, including;
   forming at least one fin of the first plurality of fins of the first plate to include:
      at least one longitudinally extending channel extending from a first portion within the least one fin of the first plurality of fins toward a second portion within the first fin structure; and
      at least one cross channel extending through the at least one fin of the first plurality of fins in fluid communication with the at least one longitudinally extending channel and an exterior of the at least one fin of the first plurality of fins;
   forming a second plate having a second fin structure comprising a second plurality of fins; and assembling the first plate and the second plate having the first plurality of fins and the second plurality of fins interleaved with respect to each other to form flow paths between adjacent fins of the first and second pluralities of fins;

forming a second flow path between adjacent fin structures of the first and second pluralities of fin structures.

20. The method according to claim 19, further comprising: depositing a coating of catalytic material on at least a portion of the fins of the first fin structure of the first plate and the second fin structure.

21. The method according to claim 20, wherein depositing a coating of catalytic material further comprises depositing platinum, palladium, and alloys thereof.

22. The method according to claim 20, wherein depositing a coating of catalytic material includes depositing the catalytic material having a thickness of approximately 0.006 inch.

23. The method according to claim 19, further comprising: forming a space of approximately 0.004 inch between portions of the first plurality of fins and the second plurality of fins.

24. The method according to claim 19, further comprising: connecting at least a portion of a heat exchange device with at least one of the first plate and the second plate.

25. The method according to claim 19, further comprising: forming a third fin structure comprising a third plurality of fins on the second plate;

forming a third plate including a fourth fin structure comprising a fourth plurality of fins; and assembling the second plate and the third plate with the third plurality of fins on the second plate and the fourth plurality of fins on the third plate interleaved with respect to each other.

26. A system comprising:
at least one water-gas shift reactor;
at least one preferential oxidation reactor; and
at least one autothermal reformer, wherein the autothermal reformer comprises:
a first plate including a first fin structure comprising a first plurality of fins,
wherein at least a portion of at least one fin of the first plurality of fins of the first plate includes:
at least one longitudinally extending channel extending from a first portion within the at least one fin of the first plurality of fins toward a second portion within the at least one fin; and
at least one cross channel extending through the at least one fin in fluid communication with the at least one longitudinally extending channel of the at least one fin of the first plurality of fins;
a second plate including a second fin structure comprising a second plurality of fins, the first plate and the second plate being assembled having a portion of at least one fin of the first plurality of fins interleaved with a portion of at least one fin of the second plurality of fins;
at least one inlet port formed in at least one of the first plate and the second plate; and
at least one outlet port formed in at least one of the first plate and the second plate;
wherein a fluid flow path through the at least one autothermal reformer is configured to connect the autothermal reformer to the at least one water-gas shift reactor and another flow path configured to connect the water-gas shift reactor to the at least one preferential oxidation reactor.

27. The system of claim 26, wherein at least a portion of one of the first plurality of fins and the second plurality of fins includes a catalytic material.

28. The system of claim 27, wherein the catalytic material comprises platinum, palladium, and alloys thereof.

29. The system of claim 26, further comprising:
a heat exchange device connected to at least one of the first plate and the second plate.

30. The system of claim 26, wherein the second plate further includes a third fin structure comprising a third plurality of fins.

31. The system of claim 30, wherein the autothermal reformer comprises a third plate including a fourth fin structure comprising a fourth plurality of fins, a portion of at least one fin of the third plurality of fins of the second plate interleaved with a portion of at least one fin of the fourth plurality of fins of the third plate.

32. The system of claim 31, wherein at least one fin of the third plurality of fins of the third plate includes:
at least one longitudinally extending channel extending from a first portion within the at least one fin of the third plurality of fins toward a second portion within the at least one fin of the third plurality of fins;
at least one cross channel extending through the at least one fin of the third plurality of fins in fluid communication with the at least one longitudinally extending channel of the at least one fin of the third plurality of fins; and
at least one aperture in fluid communication with the at least one cross channel and an exterior of the at least one fin of the third plurality of fins.

33. The system of claim 32, wherein at least one fin of the fourth plurality of fins of the third plate includes:
at least one longitudinally extending channel extending from a first portion within the at least one fin of the fourth plurality of fins toward a second portion within the at least one fin of the fourth plurality of fins;
at least one cross channel extending through the at least one fin of the fourth plurality of fins in fluid communication with the at least one longitudinally extending channel of the at least one fin of the fourth plurality of fins; and
at least one aperture in fluid communication with the at least one cross channel and an exterior of the at least one fin of the fourth plurality of fins.

34. The apparatus of claim 26, wherein the at least one fin of the first plurality of fins further includes at least one aperture in fluid communication with the at least one cross channel and an exterior of the at least one fin of the first plurality of fins.

35. The apparatus of claim 34, wherein at least a portion of at least one fin of the second plurality of fins of the second plate comprises:
at least one longitudinally extending channel extending from a first portion within the at least one fin of the second plurality of fins toward a second portion within the at least one fin structure of the second plurality of fins;
at least one cross channel extending through the at least one fin structure of the second plurality of fins in fluid communication with the at least one longitudinally extending channel of the at least one fin of the second plurality of fins; and
at least one aperture in fluid communication with the at least one cross channel and an exterior of the at least one fin of the second plurality of fins.

36. The system of claim 26, wherein at least a portion of at least one fin of the second plurality of fins of the second plate comprises:

at least one longitudinally extending channel extending from a first portion within the at least one fin of the second plurality of fin structures toward a second portion within the at least one fin of the second plurality of fins; and at least one cross channel extending through the at least one fin structure in fluid communication with the at least one longitudinally extending channel of the at least one fin of the second plurality of fins.

37. The system of claim 36, wherein the at least one fin of the second plurality of fins further includes at least one aperture in fluid communication with the at least one cross channel and an exterior of the at least one fin of the second plurality of fins.

* * * * *

UNITED STATES PATENT AND TRADEMARK OFFICE
CERTIFICATE OF CORRECTION

PATENT NO. : 8,263,027 B2
APPLICATION NO. : 12/540331
DATED : September 11, 2012
INVENTOR(S) : Girlea et al.

It is certified that error appears in the above-identified patent and that said Letters Patent is hereby corrected as shown below:

In the claims:

| | | | |
|---|---|---|---|
| CLAIM 19, | COLUMN 8, | LINE 58, | change "the least one fin" to --the at least one fin-- |
| CLAIM 34, | COLUMN 10, | LINE 46, | change "The apparatus" to --The system-- |
| CLAIM 35, | COLUMN 10, | LINE 51, | change "The apparatus" to --The system-- |

Signed and Sealed this
Twenty-seventh Day of October, 2015

Michelle K. Lee
*Director of the United States Patent and Trademark Office*